United States Patent
Kim et al.

(10) Patent No.: US 9,288,735 B2
(45) Date of Patent: Mar. 15, 2016

(54) APPARATUS AND METHOD FOR SWITCHING RADIO ACCESS TECHNOLOGY IN WIRELESS COMMUNICATION SYSTEM

(71) Applicant: Samsung Electronics Co. Ltd., Suwon-si, Gyeonggi-do (KR)

(72) Inventors: Ju-Yeop Kim, Seoul (KR); In-Yup Kang, San Diego, CA (US); Ki-Hyun Do, Yongin-si (KR); Jeong-Gyun Yu, Seoul (KR); Tae-Hee Lee, Seoul (KR); Dong-Hyun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 13/934,844

(22) Filed: Jul. 3, 2013

(65) Prior Publication Data
US 2014/0179319 A1 Jun. 26, 2014

(30) Foreign Application Priority Data
Dec. 21, 2012 (KR) .................. 10-2012-0151461

(51) Int. Cl.
- *H04W 72/00* (2009.01)
- *H04W 36/30* (2009.01)
- *H04W 36/14* (2009.01)

(52) U.S. Cl.
CPC ............. *H04W 36/30* (2013.01); *H04W 36/14* (2013.01)

(58) Field of Classification Search
USPC ........ 455/432.1, 435.1, 436, 439, 444, 452.2; 370/319–352, 252
See application file for complete search history.

(56) References Cited

U.S. PATENT DOCUMENTS

| | | | |
|---|---|---|---|
| 2003/0139184 A1 | 7/2003 | Singh et al. | |
| 2009/0016300 A1 | 1/2009 | Ahmavaara et al. | |
| 2009/0067386 A1 | 3/2009 | Kitazoe | |
| 2010/0222055 A1* | 9/2010 | Cho | H04J 11/0086 455/434 |
| 2010/0234026 A1* | 9/2010 | Tenny et al. | 455/436 |
| 2011/0286387 A1* | 11/2011 | Sane et al. | 370/328 |
| 2013/0010656 A1* | 1/2013 | Chin | H04W 48/18 370/280 |
| 2013/0053035 A1* | 2/2013 | Johansson | H04W 48/16 455/436 |
| 2013/0115950 A1* | 5/2013 | Kawasaki | H04W 36/0083 455/436 |
| 2013/0182583 A1* | 7/2013 | Siomina | H04W 24/10 370/252 |
| 2013/0223403 A1* | 8/2013 | Chen | H04W 36/24 370/331 |
| 2013/0235740 A1* | 9/2013 | Kim et al. | 370/252 |
| 2013/0258934 A1* | 10/2013 | Amerga | H04W 48/20 370/312 |
| 2013/0287002 A1* | 10/2013 | Kim et al. | 370/331 |
| 2013/0308497 A1* | 11/2013 | Novak | H04W 76/02 370/259 |
| 2013/0336285 A1* | 12/2013 | Edara et al. | 370/331 |
| 2014/0003390 A1* | 1/2014 | Gholmieh | H04W 36/24 370/331 |
| 2014/0004847 A1* | 1/2014 | Suzuki | H04W 24/10 455/422.1 |
| 2014/0341059 A1* | 11/2014 | Jang | H04W 48/06 370/252 |
| 2015/0094067 A1* | 4/2015 | Hole | H04W 24/10 455/436 |

FOREIGN PATENT DOCUMENTS

| | | |
|---|---|---|
| KR | 10-2007-0069483 A | 7/2007 |
| KR | 10-2010-0032433 A | 3/2010 |

* cited by examiner

*Primary Examiner* — Dai A Phuong
(74) *Attorney, Agent, or Firm* — Jefferson IP Law, LLP

(57) ABSTRACT

An apparatus and a method for switching a Radio Access Technology (RAT) by a User Equipment (UE) in a wireless communication system are provided. The method includes detecting an event indicating that the UE should perform a switching operation from a first RAT to a second RAT different from the first RAT occurs while the UE uses the first RAT determining whether a RAT switching operation criterion is satisfied after detecting that the event occurs and if the RAT switching operation criterion is satisfied, performing the switching operation.

24 Claims, 8 Drawing Sheets

APPARATUS AND METHOD FOR SWITCHING RADIO ACCESS TECHNOLOGY IN WIRELESS COMMUNICATION SYSTEM

CROSS-REFERENCE TO RELATED APPLICATIONS

This application claims the benefit under 35 U.S.C. §119 (a) of a Korean patent application filed on Dec. 21, 2012 in the Korean Intellectual Property Office and assigned Serial No. 10-2012-0151461, the entire disclosure of which is hereby incorporated by reference.

TECHNICAL FIELD

The present disclosure relates to an apparatus and method for switching a Radio Access Technology (RAT) in a wireless communication system.

BACKGROUND

A wireless communication system has evolved to provide various high-speed large-capacity services to User Equipments (UEs). Examples of the wireless communication system include a Universal Mobile Telecommunications System (UMTS), a Global System for Mobile communications (GSM), a High Speed Downlink Packet Access (HSDPA) mobile communication system, a High Speed Uplink Packet Access (HSUPA) mobile communication system, a Long-Term Evolution (LTE) mobile communication system, an LTE-Advanced (LTE-A) mobile communication system, a High Rate Packet Data (HRPD) mobile communication system proposed by the 3rd Generation Partnership Project 2 (3GPP2), and an Institute of Electrical and Electronics Engineers (IEEE) 802.16m mobile communication system.

Cases in which a UE selects an LTE RAT or switches to the LTE RAT in a wireless communication system of the related art will be described below.

In a 3GPP mobile communication system, the UE selects the LTE RAT or switches to the LTE RAT if the UE performs a cell selection operation, a cell reselection operation, or a cell redirection operation, a description of which will be provided below.

FIG. 1 schematically illustrates a process for selecting an LTE RAT or switching to the LTE RAT if a UE performs a cell selection operation in a 3GPP mobile communication system according to the related art.

Prior to the description of FIG. 1, the cell selection operation is an operation in which the UE selects a RAT by blindly searching an LTE cell in a state in which the UE searches no cell. The cell selection operation is a RAT selection operation which is mainly used if the UE searches no cell signal or the UE is initially powered on.

Referring to FIG. 1, the 3GPP mobile communication system includes a UE 111, a Universal Mobile Telecommunications System (UMTS) Terrestrial Radio Access Network (UTRAN) 113, and an Evolved-UTRAN (E-UTRAN) 115.

If the UE 111 cannot acquire synchronization with a cell included in the UTRAN 113 or the UE 111 is initially powered on at operation 117, the UE 111 transits into an LTE RAT mode at operation 119. In the LTE RAT mode, the UE 111 performs a cell search operation at operation 121. The E-UTRAN 115 broadcasts cell information by a preset period at operation 123, and the UE 111 performs the cell search operation using the cell information broadcasted by the E-UTRAN 115. Here, the description of the cell search operation will be omitted.

After performing the cell search operation, the UE 111 performs an LTE cell camping operation with the UTRAN 113 and the E-UTRAN 115 at operation 125. The LTE cell camping operation includes an attach procedure, a tracking area update procedure, etc., and a detailed description of the attach procedure and the tracking area update procedure will be omitted.

After performing the LTE cell camping operation, the UE 111 acquires synchronization with an LTE cell neighboring the UE 111, so the UE 111 may select an LTE RAT as a RAT of the UE 111 or switch to the LTE RAT.

FIG. 2 schematically illustrates a process for selecting an LTE RAT or switching to the LTE RAT if a UE performs a cell reselection operation in a 3GPP mobile communication system according to the related art.

Referring to FIG. 2, the 3GPP mobile communication system includes a UE 211, a UTRAN 213, and an Evolved-UTRAN 215.

The UE 211 performs a cell search operation with the UTRAN 213 at operation 217. The UTRAN 213 broadcasts cell information by a preset period at operation 219, and the UE 211 performs the cell search operation using the cell information broadcasted by the UTRAN 213. Here, the description of the cell search operation will be omitted.

After performing the cell search operation, the UE 211 performs a 3G cell camping operation with the UTRAN 213 at operation 221. The detailed description of the 3G cell camping operation will be omitted.

After performing the 3G cell camping operation, the UE 211 acquires synchronization with a cell included in the UTRAN 213, and performs an Inter-RAT measurement operation as a switching operation from a UMTS scheme to an LTE scheme at operation 223. The E-UTRAN 215 broadcasts broadcasting information by a preset period at operations 225, 227, and 229, the broadcasting information may include various parameters, and the detailed description of the broadcasting information will be omitted. The UE 211 performs the Inter-RAT measurement operation using the broadcasting information broadcasted by the E-UTRAN 215, and the detailed description of the Inter-RAT measurement operation will be omitted.

After performing the Inter-RAT measurement operation, the UE 211 transits into an LTE RAT mode at operation 231. After transiting into the LTE RAT mode, the UE 211 performs a cell search operation at operation 233. The E-UTRAN 215 broadcasts cell information by a preset period at operation 235, and the UE 211 performs the cell search operation using the cell information broadcasted by the E-UTRAN 215. Here, the description of the cell search operation will be omitted.

After performing the cell search operation, the UE 211 performs an LTE cell camping operation with the UTRAN 213 and the E-UTRAN 215 at operation 237. The LTE cell camping operation includes a tracking area update procedure, etc., and the detailed description of the tracking area update procedure will be omitted.

After performing the LTE cell camping operation, the UE 211 acquires synchronization with an LTE cell neighboring the UE 211, so the UE 211 may select an LTE RAT as a RAT of the UE 211 or switch to the LTE RAT.

The cell reselection operation in a 3GPP mobile communication system of the related art as described in FIG. 2 is an operation in which a UE which is synchronized with a cell not an LTE cell switches a RAT by determining whether there is an LTE cell neighboring the UE through signal measurement, and acquiring a synchronization from the LTE cell neighboring the UE if there is the LTE cell neighboring the UE. So, the UE does not miss a paging signal targeting the UE using a RAT which the UE already used, and the UE may independently switch to the RAT.

FIG. 3 schematically illustrates a process for selecting an LTE RAT or switching to the LTE RAT if a UE performs a cell redirection operation in a 3GPP mobile communication system according to the related art.

Referring to FIG. 3, the 3GPP mobile communication system includes a UE 311, a UTRAN 313, and an Evolved-UTRAN 315.

The UE 311 performs a cell search operation with the UTRAN 313 at operation 317. The UTRAN 313 broadcasts cell information by a preset period at operation 319, and the UE 311 performs the cell search operation using the cell information broadcasted by the UTRAN 313. Here, the description of the cell search operation will be omitted.

After performing the cell search operation, the UE 311 performs a 3G cell camping operation with the UTRAN 313 at operation 321. The detailed description of the 3G cell camping operation will be omitted.

After performing the 3G cell camping operation, the UE 311 acquires synchronization with a cell included in the UTRAN 313, and receives a cell redirection command which commands the UE 311 to perform a cell redirection operation with the E-UTRAN 315 from the E-UTRAN 315 at operation 323. The E-UTRAN 315 may transmit the cell redirection command to the UE 311 in various cases, and the detailed description of the various cases will be omitted.

After receiving the cell redirection command from the E-UTRAN 315, the UE 311 transits into an LTE RAT mode at operation 325. In the LTE RAT mode, the UE 311 performs a cell search operation at operation 327. The E-UTRAN 315 broadcasts cell information by a preset period at operation 329, and the UE 311 performs the cell search operation using the cell information broadcasted by the E-UTRAN 315. Here, the description of the cell search operation will be omitted.

After performing the cell search operation, the UE 311 performs an LTE cell camping operation with the UTRAN 313 and the E-UTRAN 315 at operation 331. The LTE cell camping operation includes a tracking area update procedure, etc., and the detailed description of the tracking area update procedure will be omitted.

After performing the LTE cell camping operation, the UE 311 acquires synchronization with an LTE cell neighboring the UE 311, so the UE 311 may select an LTE RAT as a RAT of the UE 311 or switch to the LTE RAT.

FIG. 4 schematically illustrates a process for selecting an LTE RAT or switching to the LTE RAT if a UE performs a cell selection operation in a 3GPP mobile communication system according to the related art.

Referring to FIG. 4, the 3GPP mobile communication system includes a UE 411, a UTRAN 413, and an evolved-UTRAN 415.

If the UE 411 which is synchronized with a cell included in the UTRAN 413 determines to select an LTE RAT or switch to the LTE RAT, that is, the UE 411 detects that a Fast Return to LTE event occurs at operation 417, the UE 411 transits into an idle state as a Radio Resource Control (RRC) state at operation 419. The Fast Return to LTE event is an event which commands the UE 411 to quickly select an LTE RAT or quickly switch to the LTE RAT. The Fast Return to LTE event may occur according to a system situation of the 3GPP mobile communication system, and the detailed description of a situation in which the Fast Return to LTE event occurs will be omitted.

After transiting into the idle state, the UE 411 transits into an LTE RAT mode at operation 421. In the LTE RAT mode, the UE 411 performs a cell search operation at operation 423. The E-UTRAN 415 broadcasts cell information by a preset period at operation 425, and the UE 411 performs the cell search operation using the cell information broadcasted by the E-UTRAN 415. Here, the description of the cell search operation will be omitted.

After performing the cell search operation, the UE 411 performs an LTE cell camping operation with the UTRAN 413 and the E-UTRAN 415 at operation 427. The LTE cell camping operation includes an attach procedure, a tracking area update procedure, etc., and the detailed description of the attach procedure and the tracking area update procedure will be omitted.

After performing the LTE cell camping operation, the UE 411 acquires synchronization with an LTE cell neighboring the UE 411, so the UE 411 may select an LTE RAT as a RAT of the UE 411 or switch to the LTE RAT.

The Fast Return to LTE event as described in FIG. 4 is an event which is supported on a cell selection process in which a UE quickly transits into an LTE RAT mode, and the UE performs the cell selection process after forcibly transiting into the LTE RAT mode based on the decision of the UE at a specific time. If the UE forcibly transits into the LTE RAT mode based on the Fast Return to LTE event, the UE transits into the LTE RAT mode without performing additional procedures such as a procedure in which the UE demodulates cell information and a procedure in which the UE measures a signal, so the cell reselection process in FIG. 4 has an advantage which is a quick LTE RAT mode transition speed compared with the reselection process in FIG. 2, and an advantage which is an independent LTE RAT mode transition of the UE compare with the cell redirection process in FIG. 3.

The cell selection process in FIG. 4 is generally used for a fast LTE RAT switching at a time at which a Circuit Switched (CS) domain which is established after the UE switches from an LTE RAT to a UMTS/Global System for Mobile communications (GSM) RAT through a CS fallback is released.

However, the LTE RAT selecting operation or the LTE RAT switching operation described in FIGS. 1 to 4 has the following problems.

Firstly, the LTE RAT selecting operation or the LTE RAT switching operation described in FIGS. 1 to 3 has a limitation for a UE to frequently perform a fast LTE RAT selecting operation or a fast LTE RAT switching operation.

The LTE RAT selecting operation or the LTE RAT switching operation through a cell selection operation described in FIG. 1 may be only performed in a limited scenario such as a situation in which the UE is powered on or a situation in which the UE does not acquire synchronization with a cell. The LTE RAT selecting operation or the LTE RAT switching operation through a cell reselection operation described in FIG. 2 enables a relatively stable RAT switching. However, it is impossible to perform a fast LTE RAT selecting operation or a fast LTE RAT switching operation since it takes long time to demodulate broadcasted cell information and measure a signal. If an operation state of the UE is an RRC state in which an LTE cell signal measurement is impossible, switching to an LTE mobile communication system is impossible, so the LTE RAT selecting or the LTE RAT switching is also impossible. Further, the LTE RAT selecting operation or the LTE RAT switching operation through a cell redirection operation described in FIG. 3 may be only performed in a case that there is a command from a network, so the UE may not independently perform the LTE RAT switching operation or the LTE RAT switching operation.

Secondly, in the LTE RAT selecting operation or the LTE RAT switching operation described in FIG. 4, the UE may independently perform the fast LTE RAT switching operation or the fast LTE RAT switching operation.

However, the LTE RAT selecting operation or the LTE RAT switching operation described in FIG. 4 has the following problems.

If the UE is located at a region at which an LTE service is impossible at a time at which the UE forcibly transits into an LTE RAT mode, unnecessary LTE RAT mode transition operation and cell search operation are performed since the operation mode of the UE is forcibly transited into the LTE RAT mode even though the LTE service is impossible, so no service interval increases during which the UE does not receive a signal from a Node B, and in a worst case, the UE may not receive a paging message from a network. If the UE is in a weakness-electromagnetic field at a time at which the UE forcibly transits into the LTE RAT mode, the UE fails to register an LTE RAT due to a message transfer failure during a network registration procedure after transiting into the LTE RAT mode since the operation mode of the UE is forcibly transited into the LTE RAT mode even though it is difficult to provide the LTE service, so no service interval increases and the UE may not receive the paging message like a case in which the UE is located at a region at which the LTE service is impossible.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for switching a Radio Access Technology (RAT) in a wireless communication system.

Another aspect of the present disclosure is to provide an apparatus and method for switching a RAT by a User Equipment (UE) which supports a plurality of RATs in a wireless communication system.

Another aspect of the present disclosure is to provide an apparatus and method for switching a RAT thereby minimizing a no service interval in a wireless communication system.

Another aspect of the present disclosure is to provide an apparatus and method for switching a RAT whereby a UE independently may switch the RAT in a wireless communication system.

Another aspect of the present disclosure is to provide an apparatus and method for performing a fast RAT switching operation in a wireless communication system.

In accordance with an aspect of the present disclosure, a method for switching a RAT by a UE in a wireless communication system is provided. The method includes detecting an event indicating that the UE should perform a switching operation from a first RAT to a second RAT different from the first RAT while the UE uses the first RAT, determining whether a RAT switching operation criterion is satisfied after detecting that the event occurs, and if the RAT switching operation criterion is satisfied, performing the switching operation.

In accordance with another aspect of the present disclosure, a UE in a wireless communication system is provided. The UE includes a controller for detecting an event indicating that the UE should perform a switching operation from a first RAT to a second RAT different from the first RAT occurs while the UE uses the first RAT, determining whether a RAT switching operation criterion is satisfied after detecting that the event occurs, and performing the switching operation if the RAT switching operation criterion is satisfied.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain various embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
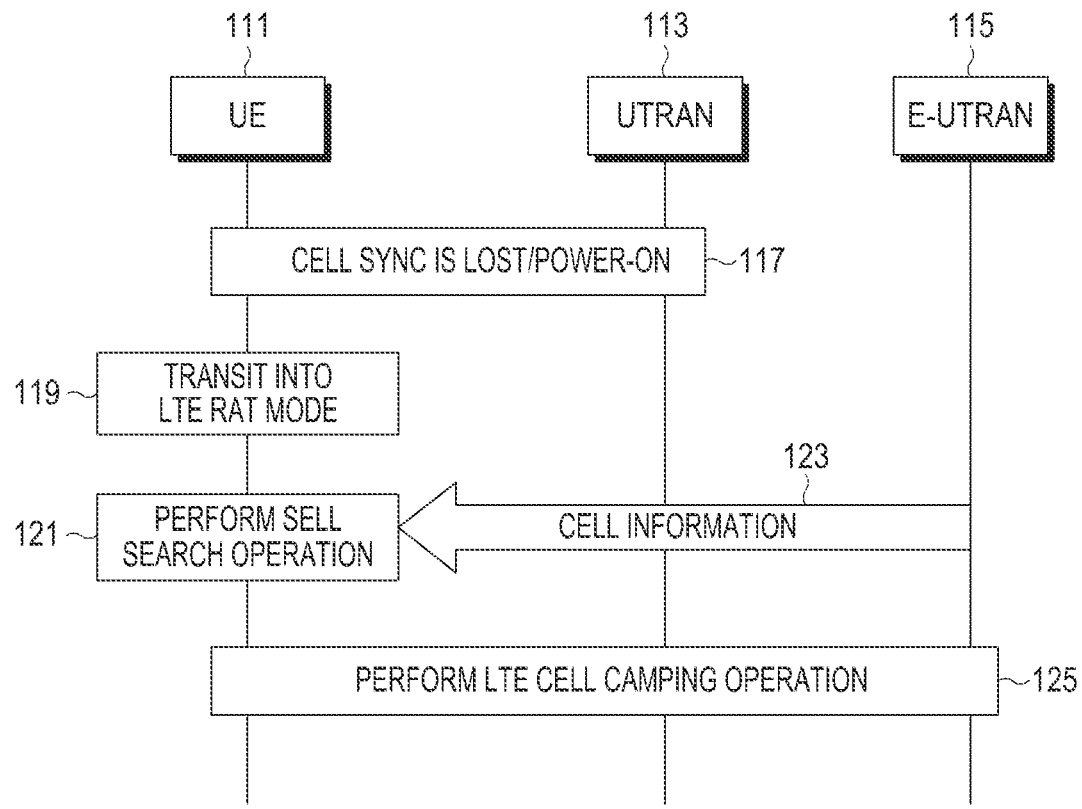
FIG. 1 schematically illustrates a process for selecting a Long Term Evolution Radio Access Technology (LTE RAT) or switching to the LTE RAT if a User Equipment UE performs a cell selection operation in a $3^{rd}$ Generation Partnership Project (3GPP) mobile communication system according to the related art.
Figure 2:
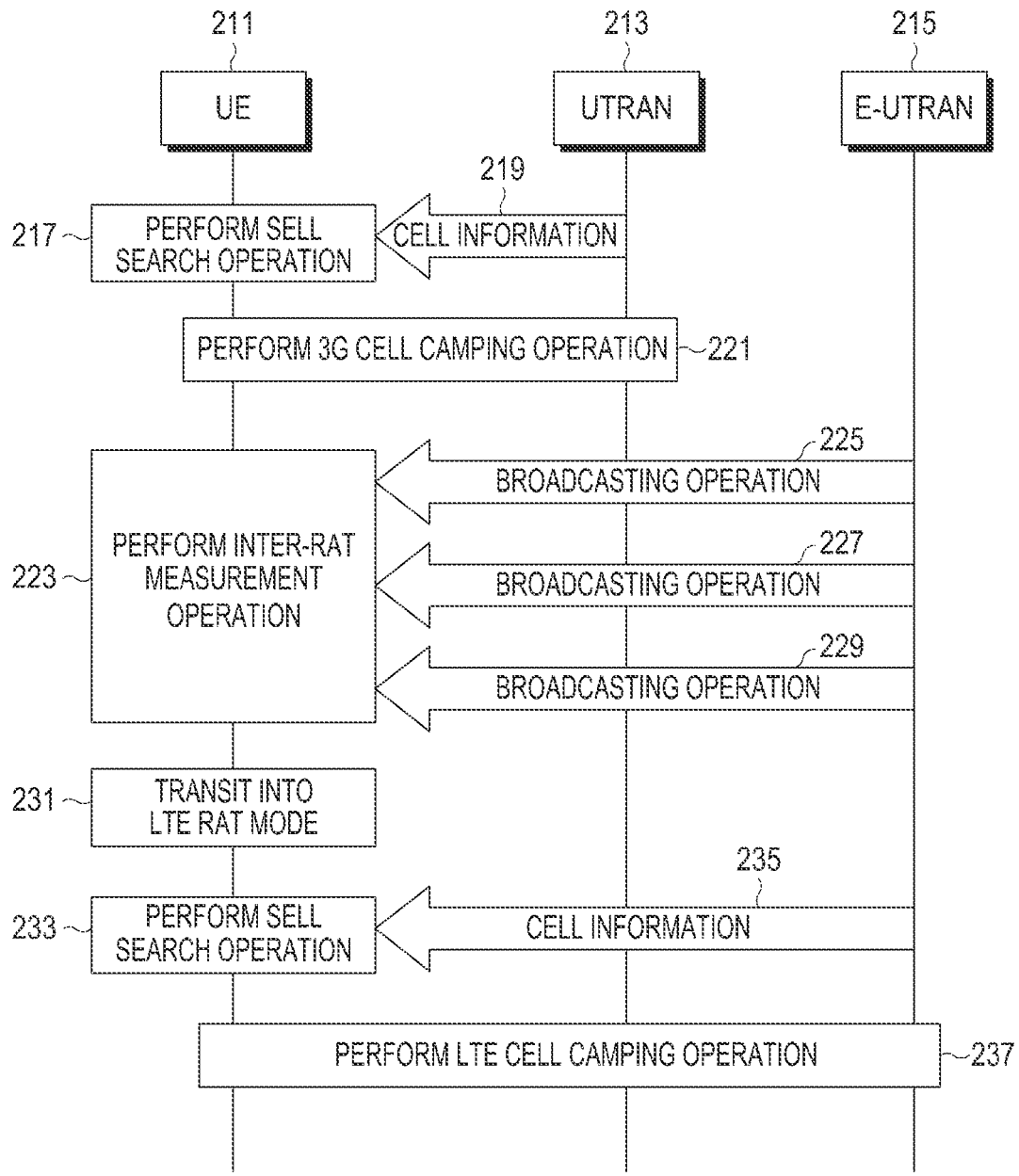
FIG. 2 schematically illustrates a process for selecting an LTE RAT or switching to the LTE RAT if a UE performs a cell reselection operation in a 3GPP mobile communication system according to the related art.
Figure 3:
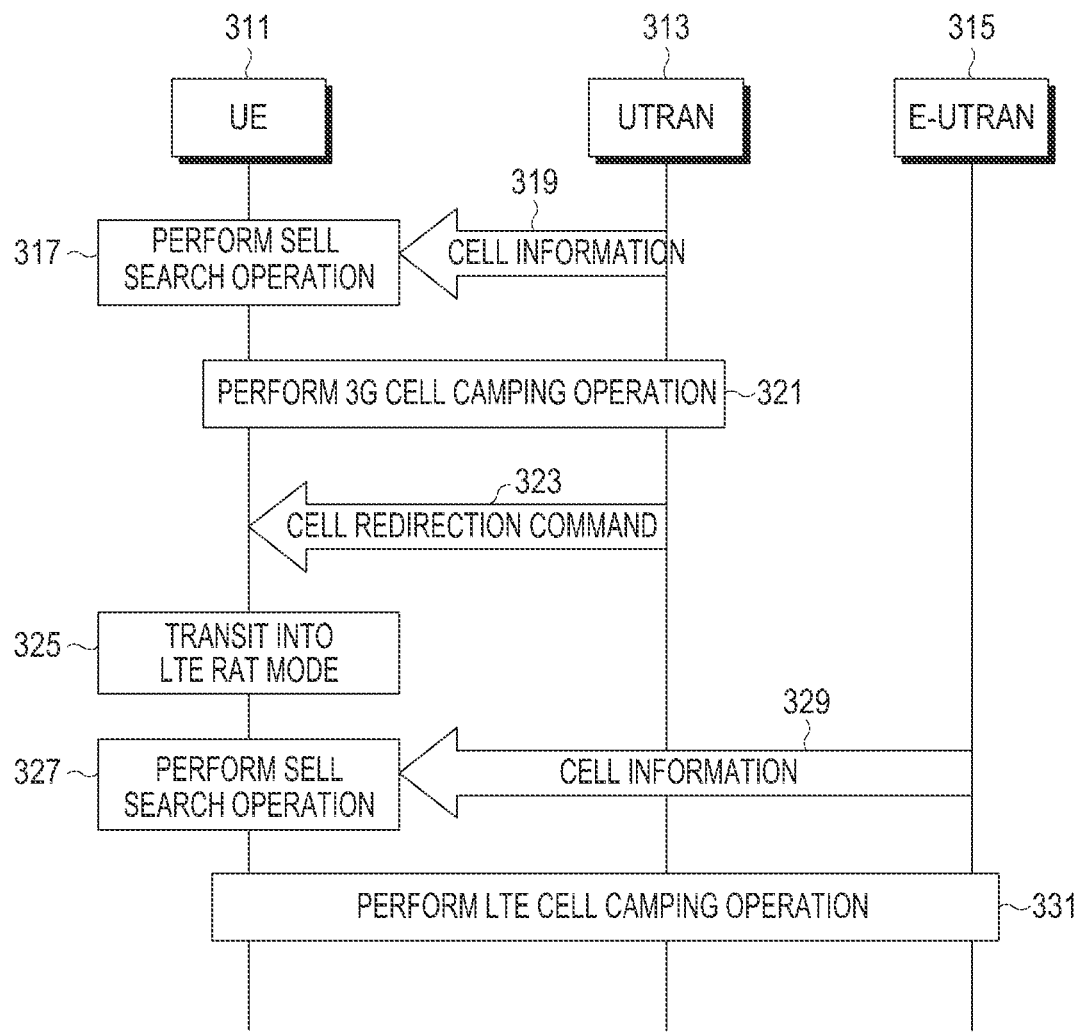
FIG. 3 schematically illustrates a process for selecting an LTE RAT or switching to the LTE RAT if a UE performs a cell redirection operation in a 3GPP mobile communication system according to the related art.
Figure 4:
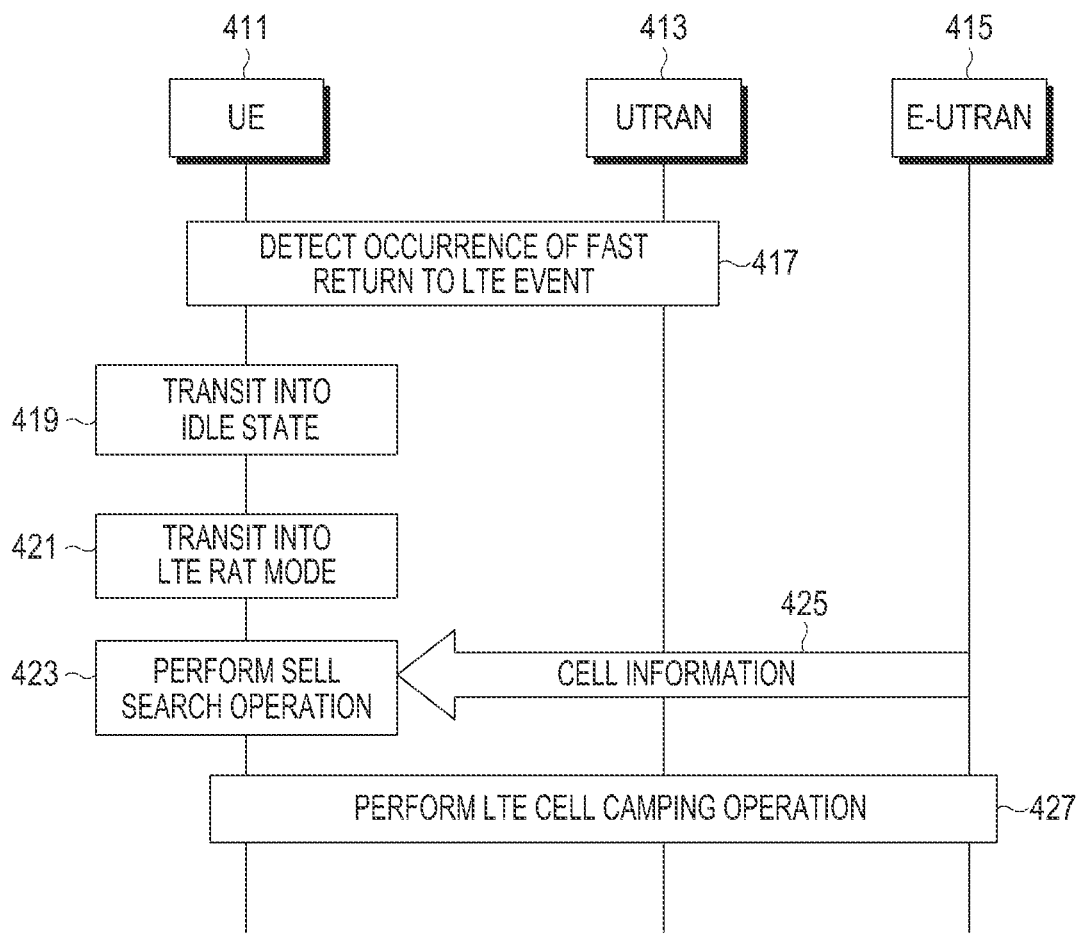
FIG. 4 schematically illustrates a process for selecting an LTE RAT or switching to the LTE RAT if a UE performs a cell selection operation in a 3GPP mobile communication system according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides an apparatus and method for switching a Radio Access Technology (RAT) in a wireless communication system.

The present disclosure provides an apparatus and method for switching a RAT by a User Equipment (UE) supporting a plurality of RATs, i.e., a multi-mode in a wireless communication system.

The present disclosure provides an apparatus and method for switching a RAT using an Inter-Radio Access Technology (IRAT) in a wireless communication system.

The present disclosure provides an apparatus and method for switching a RAT thereby minimizing a no service interval in a wireless communication system.

The present disclosure provides an apparatus and method for switching a RAT thereby a UE independently may switch the RAT in a wireless communication system.

The present disclosure provides an apparatus and method for performing a fast RAT switching operation in a wireless communication system.

An apparatus and method for switching a RAT provided in the present disclosure may be applied to various mobile communication systems such as a Universal Mobile Telecommunications System (UMTS), a Global System for Mobile communications (GSM), a High Speed Downlink Packet Access (HSDPA) mobile communication system, a High Speed Uplink Packet Access (HSUPA) mobile communication system, a Long-Term Evolution (LTE) mobile communication system, a LTE-Advanced (LTE-A) mobile communication system, a High Rate Packet Data (HRPD) mobile communication system proposed in a 3rd Generation Partnership Project 2 (3GPP2), and an Institute of Electrical and Electronics Engineers (IEEE) 802.16m mobile communication system.

Figure 5:
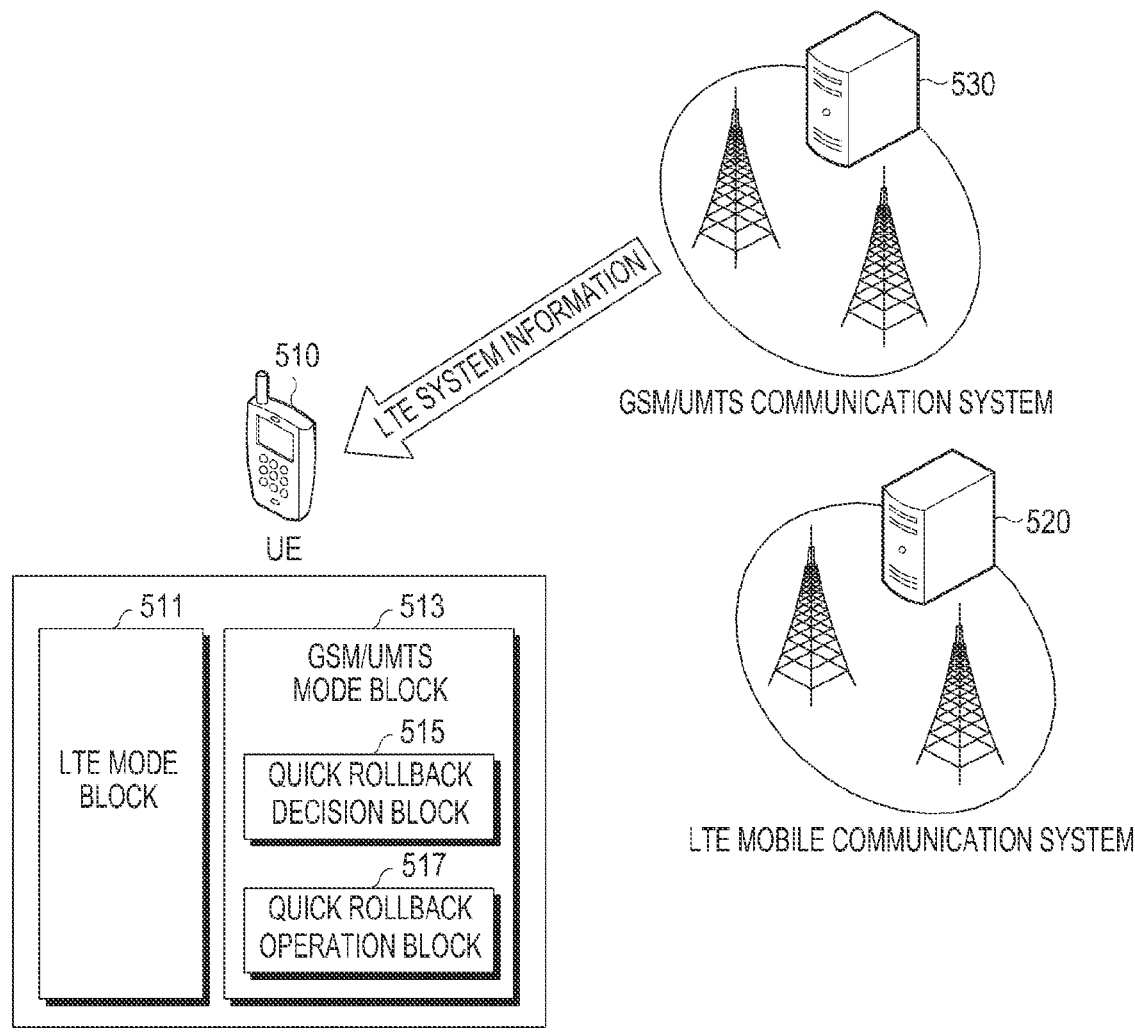
FIG. 5 schematically illustrates a structure of a wireless communication system according to an embodiment of the present disclosure.

FIG. 5 schematically illustrates a structure of a wireless communication system according to an embodiment of the present disclosure.

Referring to FIG. 5, the wireless communication system includes a UE 510 which supports a plurality of RATs such as a GSM scheme, a UMTS scheme, an LTE scheme, etc., an LTE mobile communication system 520, and a GSM/UMTS communication system 530.

The UE 510 includes an LTE mode block 511 and a GSM/UMTS mode block 513. The GSM/UMTS mode block 511 includes a quick rollback decision block 515 which determines whether the UE 510 performs a fast switching (herein, the fast switching is called as a quick rollback) operation to an LTE RAT and a quick rollback operation block 517 which performs a quick rollback operation.

The LTE system 520 is a wireless communication system which uses a RAT to which the UE 510 wants to switch and is a target wireless communication system for which the UE 510 should measure a signal.

The GSM/UMTS system 530 is a wireless communication system at which the UE 510 is currently located, and broadcasts cell information in order for the UE 510 to measure an LTE cell signal.

The quick rollback decision block 515 determines whether the UE 510 performs a quick rollback operation, and detects the following situations.
 (1) a case that a Circuit Switched (CS) domain connection is released after the UE 510 establishes the CS domain connection due to a CS Fallback.
 (2) a case that the UE 510 transits from an operation mode in which the UE 510 does not support an LTE scheme to an operation mode in which the UE 510 supports the LTE scheme.
 (3) a case that a state in which the UE 510 may not measure an LTE signal is maintained over a preset time since the UE 510 is located at a UMTS/High Speed Packet Access (HSPA) mobile communication system and receives a data service from the UMTS/HSPA mobile communication system.

The quick rollback operation block 517 performs a quick rollback operation, and performs the following operations.
 (1) an operation in which the UE 510 releases a Packet Switched (PS) domain connection if the PS domain connection is established, and transits into a Radio Resource Control (RRC) idle state.
 (2) an operation in which the UE 510 prevents transmitting a PS domain connection request message. Here, the PS domain connection request message denotes a message requesting a PS domain connection.
 (3) an operation in which the UE 510 decreases an LTE signal measurement interval using a simplified procedure and simplifies criteria for determining whether the UE 510 performs the quick rollback operation.
 (4) an operation in which the UE 510 cancels the quick rollback operation after a preset time.

Figure 6:
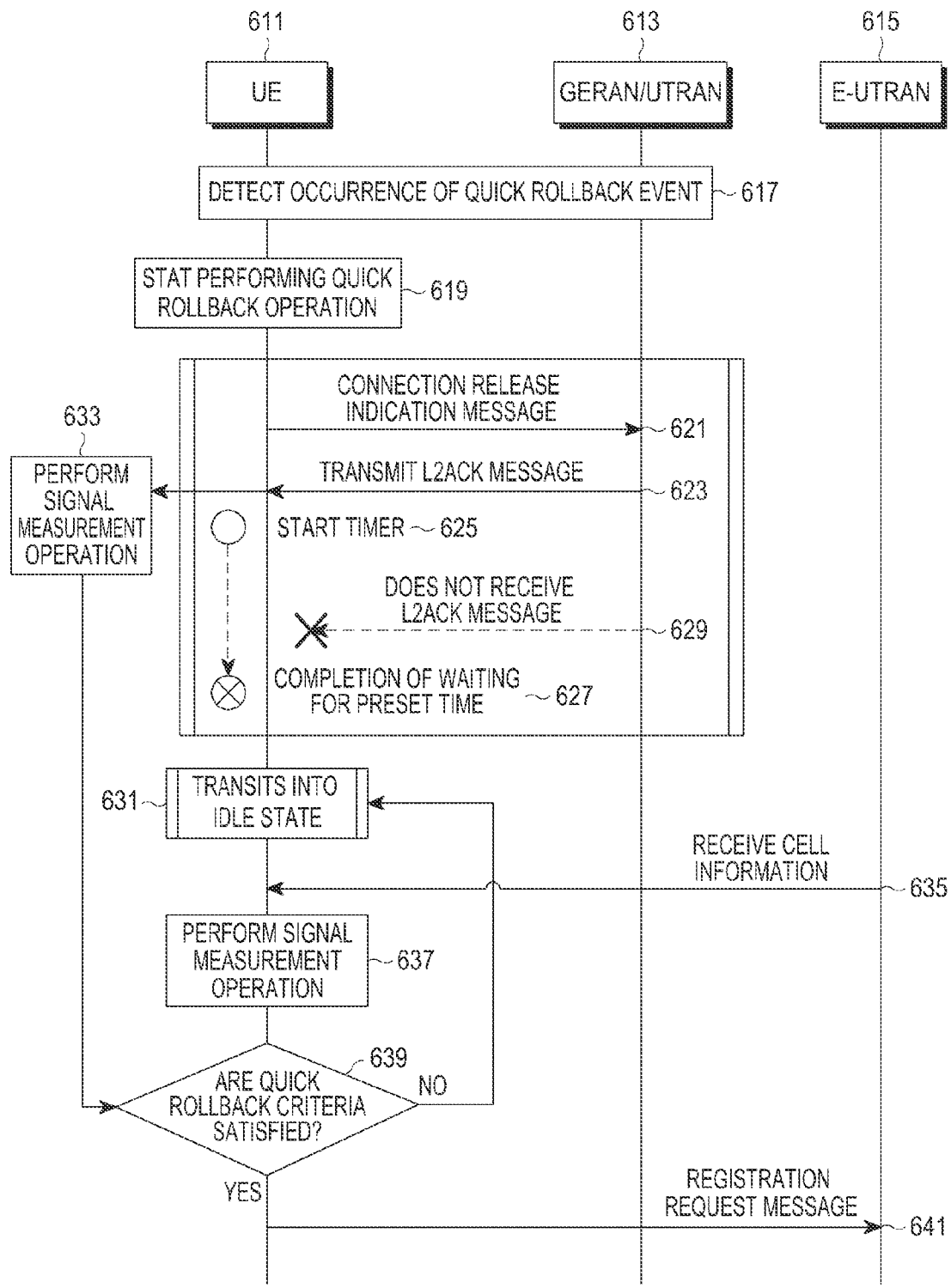
FIG. 6 schematically illustrates a process for switching a RAT in a wireless communication system according to an embodiment of the present disclosure.

FIG. 6 schematically illustrates a process for switching a RAT in a wireless communication system according to an embodiment of the present disclosure.

Referring to FIG. 6, the wireless communication system includes a UE 611, a GSM/Enhanced Data Rates for GSM Evolution (EDGE) Radio Access Network (GERAN)/UMTS Terrestrial Radio Access Network (UTRAN) 613, and an Evolved-UTRAN (E-UTRAN) 615.

The UE 611, which is synchronized with a cell included in the GERAN/UTRAN 613, detects an event indicating that the UE 611 should perform a quick rollback operation, i.e., a quick rollback event at operation 617. Here, the quick rollback decision block 515 detects occurrence of the quick rollback event. The quick rollback event may occur in three cases as described below.

Firstly, the quick rollback event occurs if a CS domain connection is released after the UE 611 establishes the CS domain connection with the GERAN/UTRAN 613 by switching from an LTE RAT to a UMTS/GSM RAT due to a CS Fallback.

Secondly, the quick rollback event occurs if the UE 611 transits from an operation mode in which the UE 611 may not switch to the LTE RAT to an operation mode in which the UE 611 may switch to the LTE RAT.

Thirdly, the quick rollback event occurs if the UE 611 is in an RRC state in which the UE 611 may not measure a signal received from the GERAN/UTRAN 613 over a preset time while the UE 611 uses the UMTS/GSM RAT.

After detecting that the quick rollback event occurs, the UE 611 starts performing a quick rollback operation at operation 619. The quick rollback operation is performed in the quick rollback operation block 517. It will be assumed that an operation mode of the UE 611 is a UMTS mode as an operation mode in which the UE 611 performs a communication using a UMTS RAT.

The UE 611 which operates in the UMTS mode determines whether there is an RRC connection established between the UE 611 and the GERAN/UTRAN 613, and transmits a Connection Release Indication message requesting to release the RRC connection established between the UE 611 and the GERAN/UTRAN 613 to the GERAN/UTRAN 613 if there is the RRC connection established between the UE 611 and the GERAN/UTRAN 613 at operation 621. After receiving the Connection Release Indication message from the UE 611, the GERAN/UTRAN 613 transmits a Layer 2 Acknowledgment (L2ACK) message as a response message to the Connection Release Indication message at operation 623.

Even though the UE 611 transmits the Connection Release Indication message to the GERAN/UTRAN 613, a case that the UE 611 may not receive the L2ACK message from the GERAN/UTRAN 613 may occur. In this case, the UE 611 uses a timer in order to prevent a case that the quick rollback operation is not normally performed. That is, the UE 611 transmits the Connection Release Indication message to the GERAN/UTRAN 613 and starts the timer at the same time at operation 625. Even though the UE 611 does not receive the L2ACK message from the GERAN/UTRAN 613 at operation 629 after completing to wait for the preset time at operation 627, the UE 611 transits into an idle state at operation 631.

After receiving the L2ACK message from the GERAN/UTRAN 613, the UE 611 performs a signal measurement operation for a fast switching from a UMTS RAT to an LTE RAT, i.e., a quick rollback at operation 633. After transiting into the idle state, the UE 611 receives cell information broadcasted by the E-UTRAN 615 at operation 635, and performs a signal measurement operation corresponding to the received cell information at operation 637.

The UE 611 determines whether the signal measurement operation result satisfies preset quick rollback criteria at operation 639. The determining operation will be described with reference to FIG. 7, so the detailed description will be omitted herein.

If the signal measurement operation result satisfies preset quick rollback criteria, the UE 611 transmits a registration message to the E-UTRAN 615 at operation 641. The detailed description of additional operations next to the registration message transmission will be omitted.

Although not shown in FIG. 6, the UE 611 does not temporarily perform an unnecessary RRC connection request operation such as a Location Area Update (LAU)/Routing Area Update (RAU) before determining whether the UE 611 performs the quick rollback operation. This is why there is a long time for the UE 611 to establish an RRC connection and the UE 611 may not measure a signal due to the RRC state transition.

If the UE 611 may not determine whether the UE 611 perform the quick rollback operation within a preset time, the UE 611 cancels a whole quick rollback process. This is why no service interval as an interval in which the UE 611 may not provide a data service due to a time increase for the quick rollback process is prevented.

Figure 7:
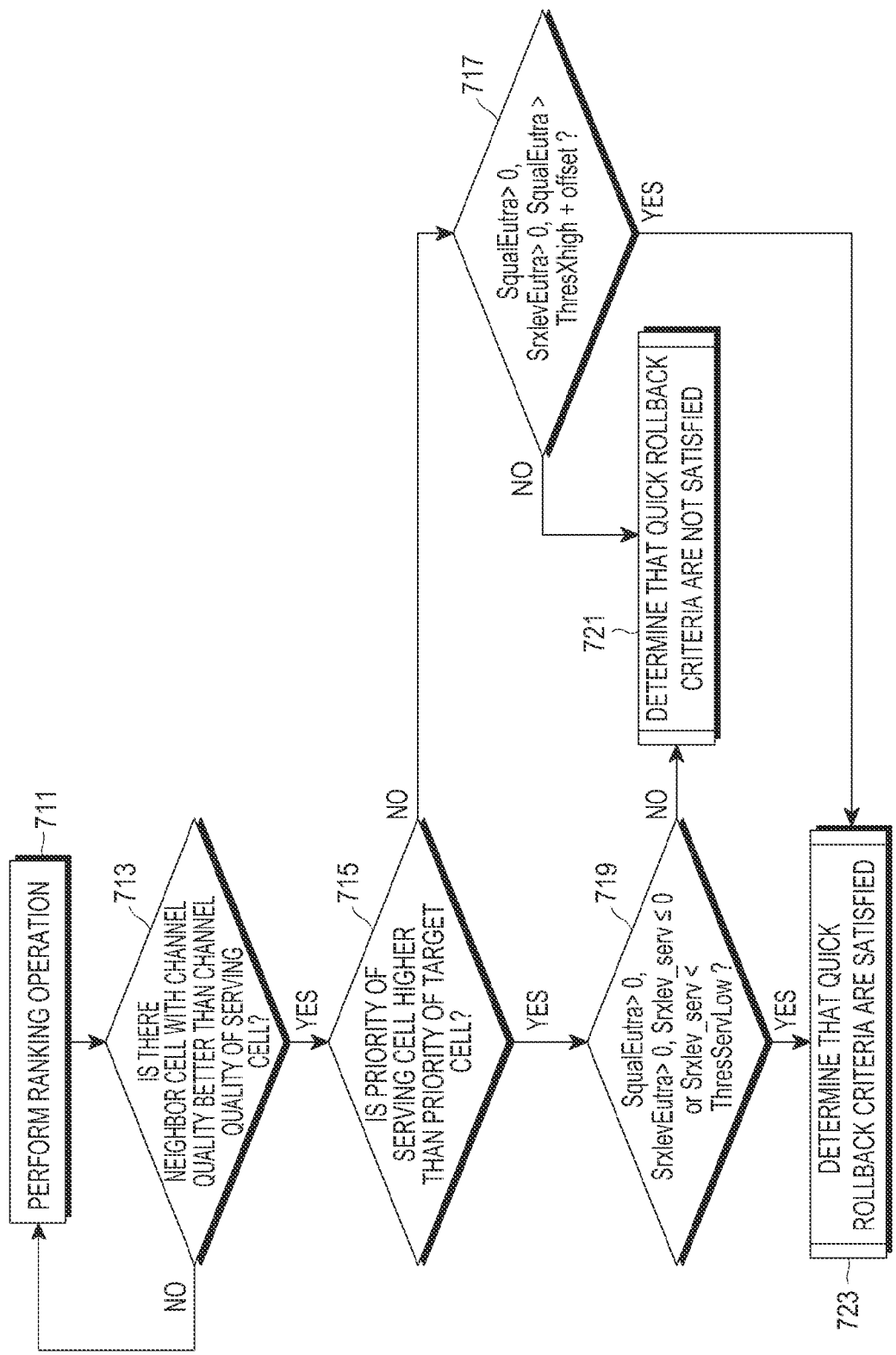
FIG. 7 schematically illustrates a process for determining whether quick rollback criteria are satisfied at operation 639 shown in FIG. 6 according to an embodiment of the present disclosure.

FIG. 7 schematically illustrates a process for determining whether quick rollback criteria are satisfied at operation 639 shown in FIG. 6 according to an embodiment of the present disclosure.

Referring to FIG. 7, the UE 611 performs a ranking operation at operation 711. The ranking operation is an operation in which the UE 611 orders a serving cell and neighbor cells based on channel qualities of the serving cell and the neighbor cells. Here, a channel quality may be determined based on various metrics such as Received Signal Code Power (RSCP), Reference Signal Received Power (RSRP), a Reference Signal Strength Indicator (RSSI), a Reference Signal Received Quality (RSRQ), a Carrier-to-Interference Noise Ratio (CINR), a Signal-to-Noise Ratio (SNR), a BLock Error Rate (BLER), and the like. The ranking operation may be performed by a preset period or may be aperiodically performed according to a system situation of a wireless communication system.

The UE 611 determines whether there is a neighbor cell which has a channel quality better than a channel quality of the serving cell at operation 713. If there is no neighbor cell which has the channel quality better than the channel quality of the serving cell, the UE 611 returns to operation 711.

If there is the neighbor cell which has the channel quality better than the channel quality of the serving cell, the UE 611 determines whether a priority of the serving cell is higher than a priority of a target cell at operation 715. Here, a priority is determined as a value which a system allocates per each cell, and the detailed description of the priority will be omitted. If there are two or more neighbor cells which have channel qualities better than the channel quality of the serving cell, the target cell is a neighbor cell which has the best channel quality among the channel qualities. If there are two or more neighbor cells which have the best channel quality, the UE 611 should perform an operation from operations 717 to 719 which will be described below for each of two or more neighbor cells which have the best channel quality. In FIG. 7, it will be assumed that the number of the neighbor cells which have the best channel quality is one.

If the priority of the serving cell is not higher than the priority of the target cell, the UE 611 determines whether a SqualEutra is greater than 0, a SrxlevEutra is greater than 0, and the SqualEutra is greater than ThresXhigh+offset (SqualEutra>0, SrxlevEutra>0, SqualEutra>ThresXhigh+offset) at operation 717. The SqualEutra may be expressed as Equation (1), and the SrxlevEutra may be expressed as Equation (2).

$$SqualEutra = EUTRA\_RSRQ - QqualminEutra \quad \text{Equation (1)}$$

In Equation (1), the EUTRA_RSRQ denotes an RSRQ which the UE 611 measures for a reference signal received from the E-UTRAN 615, and the QqualminEutra denotes a minimum RSRQ in which the UE 611 may maintain a communication with an LTE cell which uses an LTE RAT after accessing the LTE cell which uses the LTE RAT. The QqualminEutra may be set according to a system situation of a wireless communication system, and the detailed description of a QqualminEutra setting operation will be omitted.

$$SrxlevEutra = EUTRA\_RSRP - QrxlevminEutra \quad \text{Equation (2)}$$

In Equation (1), the EUTRA_RSRP denotes an RSRP which the UE 611 measures for the reference signal received from the E-UTRAN 615, and the QrxlevminEutra denotes a minimum RSRP in which the UE 611 may maintain a communication with a cell which uses the LTE RAT after accessing the cell which uses the LTE RAT. The QrxlevminEutra may be set according to the system situation of the wireless communication system, and the detailed description of a QrxlevminEutra setting operation will be omitted.

The ThresXhigh+offset denotes a value which is set according to the system situation of the wireless communication system, the ThresXhigh denotes an RSRP in which the UE 611 may normally communicate using the LTE RAT, and the offset is an offset value set as an arbitrary value. Each of the ThresXhigh and the offset may be set according to the system situation of the wireless communication system, and the detailed description of a ThresXhigh and an offset setting operation will be omitted.

If the SqualEutra is not greater than 0, the SrxlevEutra is not greater than 0, and the SqualEutra is not greater than ThresXhigh+offset, the UE 611 determines that the quick rollback criteria are not satisfied at operation 721.

If the SqualEutra is greater than 0, the SrxlevEutra is greater than 0, and the SqualEutra is greater than ThresXhigh+offset, the UE 611 determines that the quick rollback criteria are satisfied at operation 723.

If the priority of the serving cell is higher than the priority of the target cell, the UE 611 determines whether the SqualEutra is greater than 0, the SrxlevEutra is greater than 0, the SqualEutra is greater than the ThresXlow, Srxlev_serv is equal to or less than 0 or the Srxlev_serv is less than ThresServLow (SqualEutra>0, SrxlevEutra>0, SqualEutra>ThresXlow, Srxlev_serv<=0 or Srxlev_serv<ThresServLow) at operation 719. The ThresServLow denotes a value which is set according to the system situation of the wireless communication system, and the ThresServLow denotes an RSRP in which the UE 611 may normally communicate using a UMTS RAT. The ThresServLow may be set according to the system situation of the wireless communication system, and the detailed description of a ThresServLow setting operation will be omitted.

The Srxlev_serv denotes an Srxlev which is measured in a serving Node B, and the Srxlev may be expressed as Equation (3).

$$Srxlev = UTRA\_RSCP - Qrxlevmin - Pcompensation \quad \text{Equation (3)}$$

In Equation (3), the UTRA_RSCP denotes an RSRP which the UE 611 measures for a reference signal received from the GERAN/UTRAN 613, and the Qrxlevmin denotes a minimum RSRP in which the UE 611 may maintain a communication with a UMTS cell which uses a UMTS RAT after accessing the UMTS cell which uses the UMTS RAT. The Qrxlevmin may be set according to a system situation of a wireless communication system, and the detailed description of a Qrxlevmin setting operation will be omitted.

In Equation (3), the Pcompensation may be expressed as Equation (4).

$$Pcompensation = MaxAllowedUlTxPower - MaxUePower \quad \text{Equation (4)}$$

In Equation (4), the MaxAllowedUlTxPower denotes a maximum uplink transmission power which is allowed in a related cell included in the GERAN/UTRAN 613, i.e., the serving cell of the UE 611, and the MaxUePower denotes a maximum transmission power of the UE 611.

If the SqualEutra is not greater than 0, the SrxlevEutra is not greater than 0, the SqualEutra is not greater than the ThresXlow, Srxlev_serv is greater than 0 and the Srxlev_serv is equal to or greater than ThresServLow, the UE 611 determines that the quick rollback criteria are not satisfied at operation 721.

If the SqualEutra is greater than 0, the SrxlevEutra is greater than 0, the SqualEutra is greater than the ThresXlow, Srxlev_serv is equal to or less than 0 or the Srxlev_serv is less than ThresServLow, the UE 611 determines that the quick rollback criteria are satisfied at operation 723.

Figure 8:
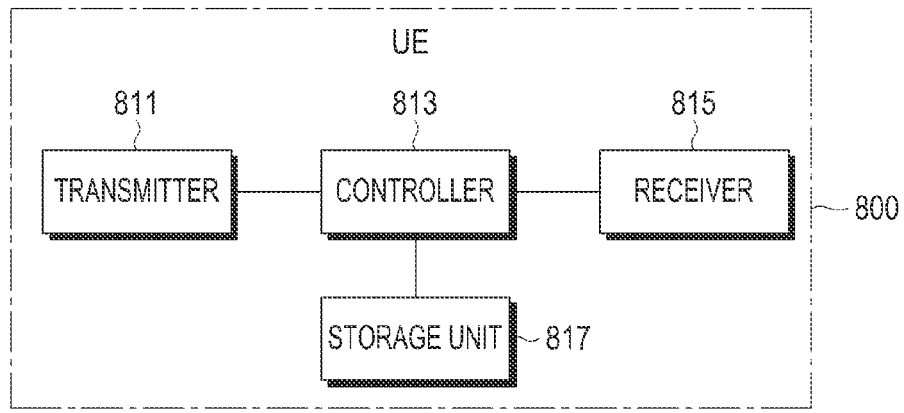
FIG. 8 schematically illustrates an internal structure of a UE in a wireless communication system according to an embodiment of the present disclosure.

FIG. 8 schematically illustrates an internal structure of a UE in a wireless communication system according to an embodiment of the present disclosure.

Referring to FIG. 8, a UE 800 includes a transmitter 811, a controller 813, a receiver 815, and a storage unit 817.

The controller 813 controls the overall operation of the UE 800. More particularly, the controller 813 controls the UE 800 to perform an operation related to a quick rollback operation. The quick rollback operation is performed in the manner described before with reference to FIGS. 5 to 7, so a detailed description thereof will be omitted herein.

The storage unit 817 stores a program and data related to the operation of the UE 800, e.g., the operation related to the quick rollback operation.

The transmitter 811 transmits signals and messages to a GERAN/UTRAN, and an E-UTRAN under a control of the controller 813. The transmitter 811 transmits the signals and the messages to the GERAN/UTRAN, and the E-UTRAN in the manner described before with reference to FIGS. 5 to 7, so a detailed description thereof will be omitted herein.

The receiver 815 receives signals and messages from the GERAN/UTRAN, and the E-UTRAN under a control of the controller 813. The receiver 815 receives the signals and the messages from the GERAN/UTRAN, and the E-UTRAN in the manner described before with reference to FIGS. 5 to 7, so a detailed description thereof will be omitted herein.

While the transmitter 811, the controller 813, the receiver 815, and the storage unit 817 are shown in FIG. 8 as separate units, it is to be understood that this is merely for convenience of description. In other words, two or more of the transmitter 811, the controller 813, the receiver 815, and the storage unit 817 may be incorporated into a single unit.

Figure 9:
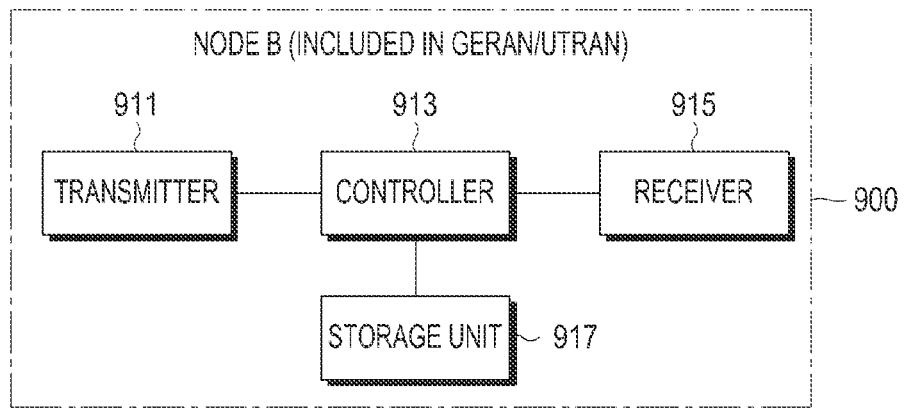
FIG. 9 schematically illustrates an internal structure of a Node B included in a GSM/Enhanced Data Rates for GSM Evolution (EDGE) Radio Access Network (GERAN)/Universal Mobile Telecommunications System (UMTS) Terrestrial Radio Access Network (UTRAN) in a wireless communication system according to an embodiment of the present disclosure.

FIG. 9 schematically illustrates an internal structure of a Node B included in a GERAN/UTRAN in a wireless communication system according to an embodiment of the present disclosure.

Referring to FIG. 9, a Node B 900 includes a transmitter 911, a controller 913, a receiver 915, and a storage unit 917.

The controller 913 controls the overall operation of the Node B 900. In particular, the controller 913 controls the Node B 900 to perform an operation related to a quick rollback operation of a UE. The quick rollback operation of the UE is performed in the manner described before with reference to FIGS. 5 to 7, so a detailed description thereof will be omitted herein.

The storage unit 917 stores a program and data related to the operation of the Node B 900, e.g., the operation related to the quick rollback operation of the UE.

The transmitter 911 transmits signals and messages to a UE, other Node Bs included in the GERAN/UTRAN, and an E-UTRAN under a control of the controller 913. The transmitter 911 transmits the signals and the messages to the UE, other Node Bs included in the GERAN/UTRAN, and the E-UTRAN in the manner described before with reference to FIGS. 5 to 7, so a detailed description thereof will be omitted herein.

The receiver 915 receives signals and messages from the UE, the other Node Bs included in the GERAN/UTRAN, and the E-UTRAN under a control of the controller 913. The receiver 915 receives the signals and the messages from the UE, the other Node Bs included in the GERAN/UTRAN, and the E-UTRAN in the manner described before with reference to FIGS. 5 to 7, so a detailed description thereof will be omitted herein.

While the transmitter 911, the controller 913, the receiver 915, and the storage unit 917 are shown in FIG. 9 as separate units, it is to be understood that this is merely for convenience of description. In other words, two or more of the transmitter 911, the controller 913, the receiver 915, and the storage unit 917 may be incorporated into a single unit.

Figure 10:
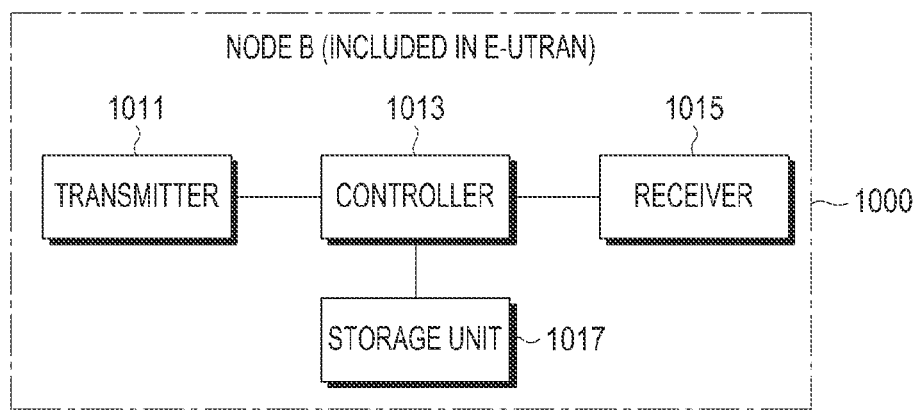
FIG. 10 schematically illustrates an internal structure of a Node B included in an Evolved-UTRAN (E-UTRAN) in a wireless communication system according to an embodiment of the present disclosure.

FIG. 10 schematically illustrates an internal structure of a Node B included in an E-UTRAN in a wireless communication system according to an embodiment of the present disclosure.

Referring to FIG. 10, a Node B 1000 includes a transmitter 1011, a controller 1013, a receiver 1015, and a storage unit 1017.

The controller 1013 controls the overall operation of the Node B 1000. In particular, the controller 1013 controls the Node B 1000 to perform an operation related to a quick rollback operation of a UE. The quick rollback operation of the UE is performed in the manner described before with reference to FIGS. 5 to 7, so a detailed description thereof will be omitted herein.

The storage unit 1017 stores a program and data related to the operation of the Node B 1000, e.g., the operation related to the quick rollback operation of the UE.

The transmitter 1011 transmits signals and messages to a UE, other Node Bs included in the E-UTRAN, and a GERAN/UTRAN under a control of the controller 1013. The transmitter 1011 transmits the signals and the messages to the UE, other Node Bs included in the E-UTRAN, and the GERAN/UTRAN in the manner described before with reference to FIGS. 5 to 7, so a detailed description thereof will be omitted herein.

The receiver 1015 receives signals and messages from the UE, the other Node Bs included in the E-UTRAN, and the GERAN/UTRAN under a control of the controller 1013. The receiver 1015 receives the signals and the messages from the UE, the other Node Bs included in the E-UTRAN, and the GERAN/UTRAN in the manner described before with reference to FIGS. 5 to 7, so a detailed description thereof will be omitted herein.

While the transmitter 1011, the controller 1013, the receiver 1015, and the storage unit 1017 are shown in FIG. 10 as separate units, it is to be understood that this is merely for convenience of description. In other words, two or more of the transmitter 1011, the controller 1013, the receiver 1015, and the storage unit 1017 may be incorporated into a single unit.

As is apparent from the foregoing description, the present disclosure enables to switch a RAT thereby minimizing no service interval in a wireless communication system.

The present disclosure enables an independent RAT switch operation of a UE in a wireless communication system.

The present disclosure enables to perform a fast RAT switching operation in a wireless communication system.

The present disclosure enables to quickly perform an independent RAT switch operation of the UE compared with an IRAT scheme in a conventional 3GPP. Therefore, the UE may quickly receive a high-quality data service, so an LTE service which has a strong preference in a view of a service provider may be provided to more users during more time.

The present disclosure enables to decrease a no service interval and receive a paging targeting the UE without missing the paging since the UE does not have to perform an unnecessary system selection operation in a situation in which a quality of an LTE signal is bad, or there is no LTE cell signal. So, the UE may receive a high-quality service and a service provider may provide the high-quality service.

The present disclosure enables to quickly switch to an LTE RAT in a situation in which it is impossible to measure an IRAT signal since the UE continuously receives a data service in a UMTS. So, the UE may receive a high-quality service according to an independent RAT switching operation without an additional operation.

The present disclosure enables to quickly switch to an LTE mobile communication system if the UE transits from a mode in which an LTE communication is impossible into a mode in which the LTE communication is possible, so the UE may fast receive an LTE service.

While the disclosure has been shown and described with reference to certain various embodiments thereof, it will be understood by those skilled in the art that various changes in form and details may be made therein without departing from the spirit and scope of the disclosure as defined by the appended claims and their equivalents.

What is claimed is:

1. A method for switching a Radio Access Technology (RAT) by a User Equipment (UE) in a wireless communication system, the method comprising:
    detecting an occurrence of an event indicating that the UE should perform a switching operation from a first RAT to a second RAT, which is different from the first RAT, while the UE uses the first RAT;
    determining whether a RAT switching operation criterion is satisfied after detecting that the event occurs; and
    if the RAT switching operation criterion is satisfied, performing the switching operation,
    wherein the determining of whether the RAT switching operation criterion is satisfied comprises:
        determining whether there is a neighbor cell which has a channel quality better than a channel quality of a serving cell,
        if the neighbor cell, which has the channel quality better than the channel quality of the serving cell, exists, determining whether a priority of the serving cell is higher than a priority of a target cell, and
        if the priority of the serving cell is higher than the priority of the target cell, determining whether the RAT switching operation criterion is satisfied using parameters which are based on a first network as a network which uses the first RAT.

2. The method of claim 1,
    wherein the determining of whether the RAT switching operation criterion is satisfied further comprises:
        performing a ranking operation in which the serving cell and neighbor cells are ordered based on channel qualities of the serving cell and the neighbor cells; and
        if the priority of the serving cell is not higher than the priority of the target cell, determining whether the RAT switching operation criterion is satisfied using parameters which are based on a second network as a network which uses the second RAT, and
    wherein, if two or more neighbor cells, which have channel qualities better than the channel quality of the serving cell, exist, the target cell is a neighbor cell which has the best channel quality among the channel qualities.

3. The method of claim 2, wherein the determining of whether the RAT switching operation criterion is satisfied using the parameters which are based on the first network as the network which uses the first RAT comprises:
    determining whether the RAT switching operation criterion is satisfied using:
        a channel quality for a reference signal received from the second network which the UE measures, a minimum channel quality in which the UE may maintain a communication with a cell which uses the second RAT after accessing the cell which uses the second RAT,
a channel quality in which the UE may normally communicate using the second RAT,
a channel quality for a reference signal received from the first network which the UE measures,
a minimum channel quality in which the UE may maintain a communication with a cell which uses the first RAT after accessing the cell which uses the first RAT,
a maximum uplink transmission power which is allowed in the serving cell, and
a maximum transmission power of the UE.

4. The method of claim 2, wherein the determining of whether the RAT switching operation criterion is satisfied using the parameters which are based on the first network as the network which uses the first RAT comprises:
determining whether the RAT switching operation criterion is satisfied using:
a channel quality for a reference signal received from the second network which the UE measures,
a minimum channel quality in which the UE may maintain a communication with a cell which uses the second RAT after accessing the cell which uses the second RAT,
a channel quality in which the UE may normally communicate using the second RAT, and
an offset value.

5. The method of claim 1, further comprising:
before the determining of whether the RAT switching operation criterion is satisfied, if a connection is established with a first network which uses the first RAT, releasing the connection with the first network.

6. The method of claim 5, wherein the releasing of the connection with the first network comprises:
transmitting a connection release indication message which requests a release of the established connection to the first network; and
receiving an ACK message as a response message to the connection release indication message from the first network.

7. The method of claim 5, wherein the releasing of the connection with the first network comprises:
transmitting a connection release indication message which requests a release of the established connection to the first network; and
if an ACK message as a response message to the connection release indication message is not received from the first network within a preset time, transitioning into an idle state.

8. The method of claim 1, wherein the event occurs if a Circuit Switch (CS) domain connection is released after the UE establishes the CS domain connection with a first network which uses the first RAT by switching from the second RAT to the first RAT due to a CS Fallback.

9. The method of claim 1, wherein the event occurs if the UE transitions from an operation mode in which the UE may not switch to the second RAT to an operation mode in which the UE may switch to the second RAT.

10. The method of claim 1, wherein the event occurs if the UE is in an operation state in which the UE may not measure a signal received from a first network which uses the first RAT over a preset time while the UE uses the first RAT.

11. The method of claim 1, further comprising:
if whether the RAT switching operation criterion is satisfied is not determined during a preset time, canceling the switching operation.

12. The method of claim 1, further comprising:
after the detecting that the event occurs, temporarily stopping a connection establishment operation for establishing a connection with a first network which uses the first RAT.

13. A User Equipment (UE) in a wireless communication system, the UE comprising:
a controller configured to:
detect an occurrence of an event indicating that the UE should perform a switching operation from a first RAT to a second RAT, which is different from the first RAT, while the UE uses the first RAT,
determine whether a RAT switching operation criterion is satisfied after detecting that the event occurs, and
perform the switching operation if the RAT switching operation criterion is satisfied,
wherein the controller is further configured to detect the occurrence of the event by:
determining whether there is a neighbor cell which has a channel quality, better than a channel quality of a serving cell,
if the neighbor cell, which has the channel quality better than the channel quality of the serving cell, exists, determining whether a priority of the serving cell is higher than a priority of a target cell, and
if the priority of the serving cell is higher than the priority of the target cell, determining whether the RAT switching operation criterion is satisfied using parameters which are based on a first network as a network which uses the first RAT.

14. The UE of claim 13,
wherein the controller is further configured to:
perform a ranking operation as an operation in which the serving cell and neighbor cells are ordered based on channel qualities of the serving cell and the neighbor cells; and
if the priority of the serving cell is not higher than the priority of the target cell, determine whether the RAT switching operation criterion is satisfied using parameters which are based on a second network as a network which uses the second RAT, and
wherein, if two or more neighbor cells, which have channel qualities that are better than the channel quality of the serving cell, exist, the target cell is a neighbor cell which has the best channel quality among the channel qualities.

15. The UE of claim 14, wherein the controller is further configured to determine whether the RAT switching operation criterion is satisfied using:
a channel quality for a reference signal received from the second network which the UE measures;
a minimum channel quality in which the UE may maintain a communication with a cell which uses the second RAT after accessing the cell which uses the second RAT;
a channel quality in which the UE may normally communicate using the second RAT;
a channel quality for a reference signal received from the first network which the UE measures;
a minimum channel quality in which the UE may maintain a communication with a cell which uses the first RAT after accessing the cell which uses the first RAT;
a maximum uplink transmission power which is allowed in the serving cell; and
a maximum transmission power of the UE.

16. The UE of claim 14, wherein the controller is further configured to determine whether the RAT switching operation criterion is satisfied using:
- a channel quality for a reference signal received from the second network which the UE measures;
- a minimum channel quality in which the UE may maintain a communication with a cell which uses the second RAT after accessing the cell which uses the second RAT;
- a channel quality in which the UE may normally communicate using the second RAT; and
- an offset value.

17. The UE of claim 13, wherein the controller is further configured to release a connection established with a first network which uses the first RAT if the connection is established with the first network which uses the first RAT before determining whether the RAT switching operation criterion is satisfied.

18. The UE of claim 17, further comprising:
- a transmitter configured to transmit a connection release indication message which requests a release of the established connection to the first network; and
- a receiver configured to receive an ACK message as a response message to the connection release indication message from the first network.

19. The UE of claim 17, further comprising:
- a receiver; and
- a transmitter configured to transmit a connection release indication message which requests a release of the established connection to the first network, wherein, if the receiver does not receive an ACK message as a response message to the connection release indication message from the first network within a preset time, the controller is further configured to transition into an idle state.

20. The UE of claim 13, wherein the event occurs if a Circuit Switch (CS) domain connection is released after the UE establishes the CS domain connection with a first network which uses the first RAT by switching from the second RAT to the first RAT due to a CS Fallback.

21. The UE of claim 13, wherein the event occurs if the UE transitions from an operation mode in which the UE may not switch to the second RAT to an operation mode in which the UE may switch to the second RAT.

22. The UE of claim 13, wherein the event occurs if the UE is in an operation state in which the UE may not measure a signal received from a first network which uses the first RAT over a preset time while the UE uses the first RAT.

23. The UE of claim 13, wherein the controller is further configured to cancel the switching operation if whether the RAT switching operation criterion is satisfied is not determined during a preset time.

24. The UE of claim 13, wherein the controller is further configured to temporarily stop a connection establishment operation for establishing a connection with a first network which uses the first RAT after the detecting that the event occurs.

* * * * *